E. M. WHEELOCK.
AUTOMATIC STEERING DEVICE FOR TRACTION ENGINES.
APPLICATION FILED MAY 20, 1912.
1,052,869.
Patented Feb. 11, 1913.
2 SHEETS—SHEET 1.
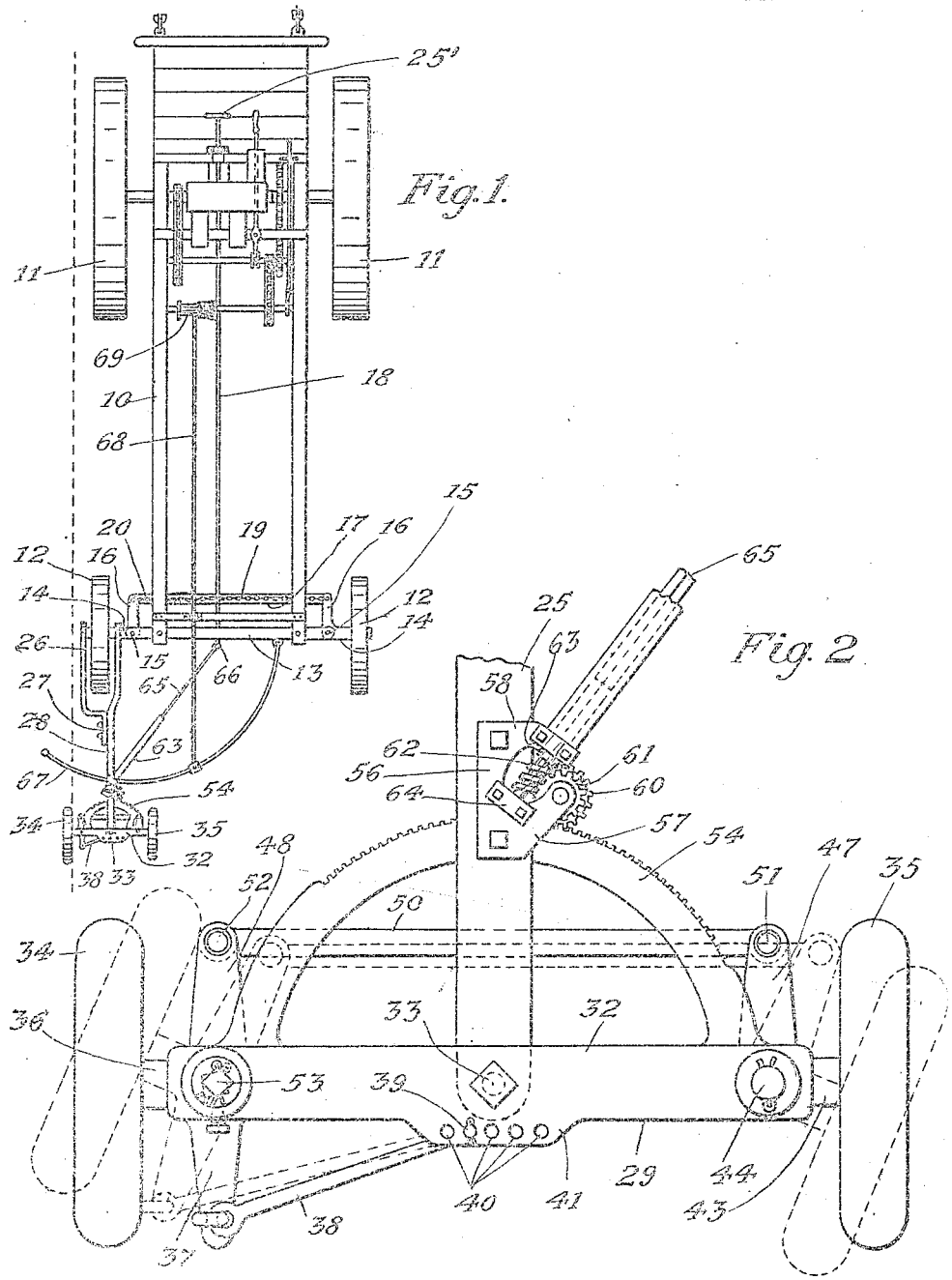
Witnesses:
Theo Lazard
Alfred E. Hagen
Inventor.
Edwin M. Wheelock.
By F. A. Whiteley
His Attorney.

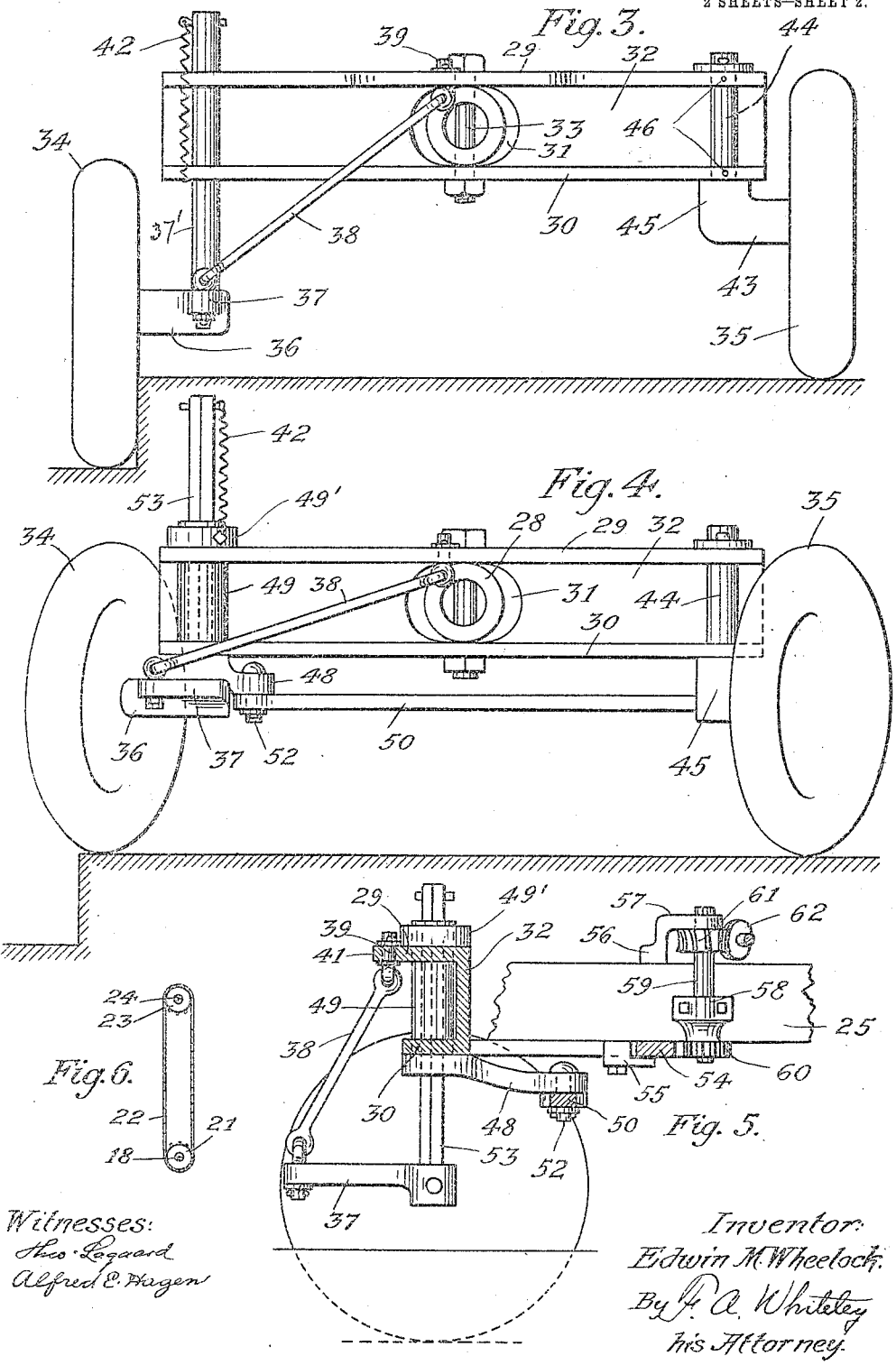

UNITED STATES PATENT OFFICE.

EDWIN M. WHEELOCK, OF WINONA, MINNESOTA.

AUTOMATIC STEERING DEVICE FOR TRACTION-ENGINES.

1,052,869.

Specification of Letters Patent.    Patented Feb. 11, 1913.

Application filed May 20, 1912. Serial No. 698,650.

*To all whom it may concern:*

Be it known that I, EDWIN M. WHEELOCK, a citizen of the United States, residing at Winona, in the county of Winona and State of Minnesota, have invented certain new and useful Improvements in Automatic Steering Devices for Traction-Engines, of which the following is a specification.

My invention relates to an automatic steering device for a traction engine, particularly such a device employed in connection with a traction engine in use for plowing.

It is the object of my invention to provide a steering device having a pilot wheel adapted to run in the furrow and contact with the side wall of the furrow, and thereby guide the engine at the proper distance from the furrow so that the plows pulled thereby properly track. To effect this result, the furrow pilot wheel will need to be set so as to turn in toward the furrow and constantly hug the furrow wall. In devices of this type heretofore employed, it has been a serious disadvantage that when the furrow was filled or if a plow had run out so there was no furrow, the turning of the wheel would cause the same to run away from the furrow, steering the engine too far from the furrow wall. For this reason, devices of this character have not been truly automatic but have required attention and watching on the part of the operator so that whenever the wheel ran up on top of the furrow, it would have to be turned back in again.

It is a principal object of my invention to provide means in connection with my furrow pilot wheel such that if it is caused to rise from the furrow to the level of the ground, it will automatically be turned from the furrow wall toward the plowed ground with the result that when the obstruction is passed, the wheel will again drop into the furrow, returning to its original angular position to continue guiding the engine.

It is a further object of my invention to provide a supporting member for the furrow pilot wheel involving a two-wheeled truck, one wheel being the furrow pilot wheel and the other running on the unplowed land to support the truck and steady the wheel, in combination with means for turning the wheels of the steering device independently of the frame upon which said wheels are mounted, and also means for turning the frame or the supporting truck as a whole.

It is also an object of my invention to provide means for operating the furrow steering wheel to turn the same which may also be used to turn the front or steering wheel of the traction engine proper.

The full objects and advantages of my invention will appear in connection with the detailed description thereof and are particularly pointed out in the claims.

In the drawings representing the application of my invention in one form,—Figure 1 is a plan view of a traction engine showing my improvements connected thereto. Fig. 2 is an enlarged plan view of the pilot steering apparatus. Fig. 3 is a front elevation of the same showing the pilot wheel in the furrow. Fig. 4 is a view similar to Fig. 3 after the pilot wheel has been drawn out of the furrow. Fig. 5 is a fragmentary end view, partly in section, of the steering mechanism. Fig. 6 is a detail view showing the means of operating the steering device.

The frame 10 of the traction engine is supported by traction wheels 11, of usual type, and front steering wheels 12 secured to a divided axle 13 by means of stub axles 14 secured to the axle 13 by vertical pivot pins 15. The stub axles 14 are provided with arms 16 extending inwardly at right angles thereto and connected by a bar 17. A steering rod 18 extends horizontally at the bottom of the frame 10 passing through the axle 13 and having removably secured thereto steering chains 19 and 20 secured to the ends of the arms 16. The rod 18 has thereon at its rear end a sprocket wheel 21 which is connected by means of a sprocket chain 22 with a sprocket wheel 23 on a horizontal shaft 24 upon which is secured the hand steering wheel 25'. When this wheel is rotated, the shaft 18 will be rotated, winding up one and unwinding the other of the chains 19 or 20, thus operating to swing the stub axles 14 on their vertical pivots 15, such swinging being simultaneously in the same direction by reason of the connecting bar 17.

Pivotally secured to the stub axle 14 at one side of the machine, preferably the right side, is a frame member 25 which may be a bar of channel iron, tubular iron, or other similar member having a bearing on the stub axle 14 inside of the wheel 12, a strap 26 of such strength as is needful being secured to bar 25 and 27, and offset so as to extend in parallel relation to said bar outside of the wheel 12 and having a bearing at the outer end of stub axle 14. The frame 25 will, therefore, be capable of oscillation in a vertical plane but will be held from rotation or lateral vibration relative to the stub axle 14 by reason of the double bearing thereon of the main bar 25 and the strap 26. The end of bar 25 may be formed as or have secured thereto a tubular member 28 slightly flattened on top and bottom and adapted to enter between the flanges 29 and 30 and through an opening 31 in the web of a channel casting 32. A kingbolt 33 extending through vertically alined holes in web flanges 29 and 30 and corresponding holes in frame end 28 pivotally secures the member 32 to the end of the frame 25. If desired, the holes in the frame end 28 may be made slightly larger than the diameter of bolt 33 to permit a very limited lateral oscillation of member 32 upon frame 25.

A pair of wheels are secured to the crossbar 32, one of which will be the furrow pilot wheel 34 and will be mounted for vertical movement relative to the cross bar 32 and also so as to be capable of independent oscillation on said cross bar. The other wheel 35, as shown in Figs. 2 and 4, may be mounted on the cross bar 32 for horizontal oscillation similar to and effected simultaneously with that of the furrow wheel or, as shown in Fig. 3, the mounting of said wheel may be such as to make it rigidly aline with the cross bar 32 at all times. In either event, the movable wheel or wheels will be secured to the cross bar so that oscillation of the cross bar on the vertical pivot 33 will correspondingly swing the wheels at the ends of the cross bar.

As shown in Fig. 3, the pilot wheel 34 is journaled on a stub axle 36 extending at right angles to an elongated shaft 37' which has a double vertical bearing in the flanges 29 and 30 of cross bar 32. Extending forwardly from axle 36 is an arm 37 which arm is also shown in Fig. 2 and Fig. 4. The arm 37 is connected by means of a link 38 with a bolt 39 extending through one of a series of apertures 40 formed in flange 29 which may be forwardly extended as indicated at 41 for that purpose, the object of the series of holes being to set the furrow wheel 34 relatively to the cross bar 32 so that in different depths of plowing it will be held in the proper position. The rod or shaft 37' is made long enough so as to permit a considerable amount of vertical movement of said rod in its bearings, sufficient so that at whatever depth the plowing may be done pilot wheel 34 may rest in the bottom of the furrow while wheel 35 is on top of the furrow and the cross bar 32 will extend between the same in a substantially horizontal position, it being noted that the cross bar 32 is mainly supported by wheel 35. Of course when the wheel is raised or lowered the distance between the points of connection of the link 38 to the end of arm 37 and flange 29 would vary if said arm traveled in a vertical plane. If, therefore, link 38 is so set that when pilot wheel 34 is in the bottom of the furrow it will be parallel with wheel 35, when the pilot wheel 34 is caused to rise out of the furrow, since the link 38 is fixed in extent, a leverage will be produced which will cause said link, through arm 37, to turn wheel 34, as indicated in Fig. 4 and in dotted lines in Fig. 2. In ordinary plowing operations the pilot wheel 34 will have been turned toward the wall of the furrow when positioned in the furrow, by a turning of the frame or the cross bar 32, so that this differential oscillation as the wheel rises will have the result of compensating for the working angularity of the pilot wheel and will further turn the wheel somewhat toward the plowed land causing the same to return to the furrow after the obstruction has been passed, when it will again drop down and in doing so will be returned by rod 38 acting through arm 37 to its initial operative position.

If desired, a spiral spring 42 may extend from flange 30 to the upper end of shaft 37' normally tending to force wheel 34 down into the furrow and aiding in supporting and steadying the end of cross bar 32. If, however, wheel 34 is made reasonably heavy, it is believed that no spring will be required.

The supporting wheel 35 will be preferably secured upon the stub axle 43 provided with a vertical rod 44 having thereon a shoulder 45. As shown in Fig. 3, the rod 44 is rigidly secured to flanges 29 and 30 by means of bolts 46. If desired, however, the stub axle 43 may be provided with an arm, similar to arm 37 and connected by a link, similar to link 38 with the flange 29 by means of one of the holes 40. This form of connection would permit the wheels 34 and 35 to be oscillated relatively and held in a differential position such that when the frame is turned to give the pilot wheel 34 the proper angle in the furrow for steering purposes, the wheel 35 will be turned straight so as to run parallel with the furrow.

As shown in Figs. 2, 4 and 5, the wheels 34 and 35 are connected in parallel relation to oscillate in unison. To effect this, an arm 47 extends back from shaft 44 and a similar arm 48 extends back from a sleeve 49 having bearings in the flanges 29 and 30 and being provided with a collar 49' resting upon flange 29 for holding said sleeve in position, a bar 50 being pivotally connected at 51 and 52 with arms 47 and 48, respectively. The sleeve 49 is provided with a square vertical hole in which is mounted a square shaft 53 corresponding to the round shaft 37', shown in Fig. 3, and connected to the stub axle 36. Shaft 53 is vertically slidable in the sleeve 49 and, of course, turning of shaft 53 will correspondingly turn the sleeve 49 in its bearings in flanges 29 and 30 which, through arms 48 and 47 and connecting bar 50 will correspondingly turn shaft 44 and oscillate wheels 34 and 35 in unison, the arm 37 on shaft 53 being exactly the same in connection and operation as has already been described with respect to the showing in Fig. 3.

Means are provided for oscillating cross bar 32 upon the pivotal bolt 33 from the platform of the engine. To accomplish this, a segment arc 54 extends rearwardly beneath the frame member 25, a guide lip 55 operating to hold the same in proper relative position to said frame member. A bracket 56 is secured to the top of member 25 and is provided with two arms 57 and 58. In a bearing in arm 57 and another bearing formed in a bracket 58 secured to the side of frame member 25 is journaled a vertical shaft 59 having at its lower end a spiral gear 60 meshing with gear segment 54. Adjacent the other end of shaft 59 is a worm wheel 61 in mesh with a worm 62 on a sleeve 63 having bearings in arm 58 and another bearing extension 64 on bracket 56. The sleeve 63 is provided with a square hole in which slides a square shaft 65 connected by universal joint 66 with the end of steering rod 18 extended through front axle 13.

Means for raising the steering apparatus consisting of an arc member 67 extending beneath frame 25 and operated by cable 68 and drum 69 are disclosed and claimed in Patent Number 954,839, and need not be further described herein.

When the furrow steering apparatus is employed, the chains 19 and 20 will be disconnected from shaft 18. Upon turning the steering wheel 25, the shaft 18 will be correspondingly turned by the sprocket chain 22 and through universal joint 66 this will turn square shaft 65 and sleeve 63 which, through worm 62, worm wheel 61 and gear 60, and segment 54 will turn the frame 32 upon the pivot pin 33. As the wheels 34 and 35 move over the ground, if they are angularly disposed, they will operate to turn the stub axle 14 to which they are connected by frame 25, the other stub axle 14 being correspondingly turned through connection 17 which will have the effect of steering the engine the same as would be true if the engine steering wheels were operated by steering chains 19 and 20, the sliding engagement upon square shaft 65 and sleeve 63 permitting the variation in length of this connection which must take place when frame 25 is oscillated with stub axle 14 and wheel 12. When the furrow pilot wheel is used for guiding the engine in connection with plowing, the wheel 34 will be set by means just described so as to turn in and hug the landside wall of the furrow. By reason of the use of the spiral gear and worm wheel on the end of sleeve 63, the wheels will be locked where set. If now a point in the furrow is encountered where the sods fell back so as to fill the same or where a plow came out in the previous round so that the furrow terminates, the pilot wheel 34 will be raised out of the furrow. But, by reason of the connecting link 38 to the arm 37, the raising of said wheel will swing the same on its pivot rod 37' or sleeve pivot 49, according to which form is used, so as to turn it in the opposite direction with the result that the pilot wheel will go over the obstruction closing the furrow and be turned back into the furrow, again to encounter the furrow wall where such is to be found. So, too, any tendency of the wheel to climb the wall of the furrow, due to its being broken or soft or perhaps from the wheel being set in at too much of an angle will at once be compensated, for the reason that as soon as the wheel begins to rise it is turned back and before reaching the top of the furrow will have been sufficiently turned so that it will again seek the bottom of the furrow. Thus, I provide an absolutely automatic furrow steering device which will guide the engine, not only when there is a perfect furrow to follow but where the furrow is more or less broken and filled and even where there are stretches of no furrow at all. The device is simple in structure and by reason of the manner of connecting the same with the operating mechanism of the steering wheels of the engine proper may be applied with extreme ease and may be used in connection with such an engine very readily when the same is employed for plowing purposes.

I claim:—

1. A steering device for traction engines comprising a pilot wheel, means connecting said wheel with the steering wheels of the engine, including means for permitting the pilot wheel to move vertically relatively to the connecting means, and means coöperating with the pilot wheel for oscillating the same in a horizontal plane when it is moved vertically.

2. A steering device for traction engines comprising a pilot wheel, a frame connected with the steering axle of the traction engine in which said pilot wheel is journaled for vertical sliding movement, means on the engine under the control of the operator for oscillating the pilot wheel, and means automatically operating to oscillate said wheel when the same moves up or down.

3. A steering device for traction engines comprising a frame connected with the steering axle of the engine for pivotal movement in a vertical plane, a wheel journaled on said frame for supporting the same, a pilot wheel having the axis thereof mounted for vertical movement in said frame, said pilot wheel being adapted to run in the furrow, and means connected therewith for automatically oscillating the wheel in opposite directions as the wheel rises and falls in the furrow.

4. A steering device for traction engines comprising a frame connected with the steering axle of the engine for pivotal movement in a vertical plane, a wheel journaled on said frame for supporting the same, a pilot wheel having the axis thereof mounted for vertical movement in said frame, said pilot wheel being adapted to run in the furrow, and means connected therewith for automatically oscillating the wheel toward the landside of the furrow when the wheel descends and toward the plowed land when the wheel rises.

5. A steering device for traction engines comprising a pilot wheel, means connecting said wheel with the steering wheels of the engine, including means for permitting the pilot wheel to move vertically relatively to the connecting means, means under the control of the operator for oscillating said wheel from the engine to steer the same, and means for automatically oscillating the pilot wheel when the same is moved vertically.

6. A steering device for traction engines comprising a frame connected with the steering axle of the engine for pivotal movement in a vertical plane, a cross axle journaled on said frame, a pair of wheels journaled on the cross axle one of which is movable vertically in the cross axle, and means under the control of the operator for oscillating said axle and wheels from the engine.

7. A steering device for traction engines comprising a frame connected with the steering axle of the engine for pivotal movement in a vertical plane, a cross axle journaled on said frame, a pair of wheels journaled on the cross axle one of which is movable vertically, and means connected with the steering mechanism of the engine for oscillating said axle and wheel.

8. A steering device for traction engines comprising a frame connected with the steering axle of the engine for pivotal movement in a vertical plane, a cross axle journaled on said frame and comprising a segment gear, a vertical shaft on the frame provided with a gear in mesh with said segment gear, a worm wheel on said shaft, a rod, a worm on the rod in mesh with said worm wheel, and means under the control of the operator for rotating the rod.

9. A steering device for traction engines comprising a frame connected with the steering axle of the engine for pivotal movement in a vertical plane, a cross axle journaled on said frame and comprising a segment gear, a vertical shaft on the frame provided with a gear in mesh with said segment gear, a worm wheel on said shaft, a rod, a worm on the rod in mesh with said worm wheel, and means connected with the steering mechanism of the traction engine for rotating the rod.

10. A steering device for traction engines comprising a frame connected with the steering axle of the engine for pivotal movement in a vertical plane, a cross axle journaled on said frame and comprising a segment gear, a vertical shaft on the frame provided with a gear in mesh with said segment gear, a worm wheel on said shaft, a rod, a worm on the rod in mesh with said worm wheel, a steering rod extending longitudinally beneath the frame of the traction engine and connected by universal joint with the worm-rod, and means for rotating the steering rod.

11. A steering device for traction engines comprising a frame connected with the steering axle of the engine for pivotal movement in a vertical plane, a cross axle journaled on said frame and comprising a segment gear, a vertical shaft on the frame provided with a gear in mesh with said segment gear, a worm wheel on said shaft, a rod, a worm on the rod in mesh with said worm wheel, a steering rod extending longitudinally beneath the frame of the traction engine and connected by universal joint with the worm-rod, a shaft and hand-wheel thereon parallel with the longitudinal rod, and sprocket chain connections between the parallel shafts.

12. A steering device for traction engines comprising a shaft journaled longitudinally in the frame of the traction engine at the lower side thereof and extending centrally through the front axle of the engine, means under the control of the operator for rotating said shaft, a furrow pilot wheel located in advance of the engine for guiding the same when plowing, and means operatively connecting said pilot wheel and shaft whereby rotation of the shaft will oscillate the pilot wheel.

13. A steering device for traction engines comprising a frame connected with the steering axle of the engine, a cross axle held relatively fixed on said frame, a pair of wheels journaled in said cross axle for oscillation about vertical axes, one of said wheels being movable vertically, means connecting said wheels to oscillate in unison, and means connected with the vertically movable wheel for automatically oscillating said wheels when the vertically movable wheel is caused to rise or fall.

14. A steering device for traction engines comprising a frame connected with the steering axle of the engine, a cross axle held relatively fixed on said frame, a pair of wheels journaled in said cross axle for oscillation about vertical axes, the axes of one of said wheels being vertically slidable in its bearing, an arm on said slidable axis, and a rod connected with said arm and with a fixed part of the frame so that movement of the said axis and arm vertically will operate to oscillate the arm and wheel.

15. A steering device for traction engines comprising a frame connected with the steering axle of the engine, a cross axle held relatively fixed on the frame, a pair of wheels journaled in said cross axle for oscillation about vertical axes, the axes of one of said wheels being vertically slidable in its bearing, a spring operating normally to hold said axis and wheel in lowered position, an arm on said slidable axis, and a rod connected with said arm and with a fixed part of the frame so that movement of the said axis and arm vertically will operate to oscillate the arm and wheel.

In testimony whereof I affix my signature in presence of two witnesses.

EDWIN M. WHEELOCK.

Witnesses:
R. H. JACOBSON,
H. A. BOWMAN.